(12) United States Patent
Jalaldeen et al.

(10) Patent No.: US 8,938,709 B2
(45) Date of Patent: Jan. 20, 2015

(54) MULTIPLE ARCHITECTURE VIEWPOINTS IN SINGLE UNIFIED MODELING LANGUAGE (UML) MODEL

(75) Inventors: Ahamed Jalaldeen, Bangalore (IN); Cedric Sequeira, Pune (IN)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/343,969

(22) Filed: Jan. 5, 2012

(65) Prior Publication Data
US 2013/0179857 A1 Jul. 11, 2013

(51) Int. Cl.
G06F 17/50 (2006.01)
G06F 11/00 (2006.01)
G06F 9/44 (2006.01)
G06F 9/45 (2006.01)

(52) U.S. Cl.
USPC ............. 717/104; 703/1; 714/47.1; 717/100; 717/105; 717/136

(58) Field of Classification Search
None
See application file for complete search history.

(56) References Cited

U.S. PATENT DOCUMENTS

| | | | |
|---|---|---|---|
| 7,509,629 B2 | 3/2009 | Sakamoto et al. | |
| 7,716,254 B2 | 5/2010 | Sarkar et al. | |
| 8,225,273 B2 * | 7/2012 | Hall et al. | 717/104 |
| 2007/0016610 A1 * | 1/2007 | Cohen et al. | 707/104.1 |
| 2008/0040364 A1 * | 2/2008 | Li | 707/100 |
| 2008/0263510 A1 * | 10/2008 | Nerome et al. | 717/104 |
| 2009/0132211 A1 | 5/2009 | Lane et al. | |
| 2009/0178019 A1 * | 7/2009 | Bahrs et al. | 717/104 |
| 2009/0319981 A1 * | 12/2009 | Akkiraju et al. | 717/104 |
| 2010/0077386 A1 * | 3/2010 | Akkiraju et al. | 717/136 |
| 2010/0146479 A1 * | 6/2010 | Arsanjani et al. | 717/105 |
| 2010/0153907 A1 | 6/2010 | Hanner et al. | |
| 2011/0087614 A1 | 4/2011 | Whittington et al. | |
| 2011/0145657 A1 * | 6/2011 | Bishop et al. | 714/47.1 |
| 2012/0143570 A1 * | 6/2012 | Austin et al. | 703/1 |

OTHER PUBLICATIONS

Rohloff, Michael, "Enterprise Architecture—Framework and Methodology for the Design of Architectures in the Large", 2005, ECIS 2005 Proceedings, Paper 113. http://aisel.aisnet.org/ecis2005/113.

* cited by examiner

*Primary Examiner* — Don Wong
*Assistant Examiner* — Anibal Rivera
(74) *Attorney, Agent, or Firm* — George R. McGuire; John Pivnichny; Bond Schoeneck & King, PLLC

(57) ABSTRACT

A method, a system and a program product provide for defining for an information technology (IT) system that may be modeled within the context of a plurality of architecture viewpoints, and whose model elements are defined within a configuration file, a plurality of architecture viewpoints within a single UML model. The method, the system and the program product also provide for synchronously automatically updating a remainder of the architecture viewpoints when one of the architecture viewpoints is manually updated.

15 Claims, 9 Drawing Sheets

MULTIPLE ARCHITECTURE VIEWPOINTS IN SINGLE UNIFIED MODELING LANGUAGE (UML) MODEL

BACKGROUND OF THE INVENTION

1. Field of the Invention

Embodiments relate generally to architecture modeling capabilities. More particularly, embodiments relate to architecture modeling capabilities of information technology systems.

2. Description of the Related Art

Information technology architecture, including but not limited to hardware architecture and software architecture, is desirably documented and modeled so that an IT architecture may be optimized within the context of available information technology resources and incumbent information technology needs. Desirably, such documentation and modeling may be undertaken in a fashion that provides for enhanced information technology capabilities.

Since information technology and data processing requirements are likely to increase, desirable are architecture modeling methods and architecture modeling apparatus that have enhanced capabilities.

BRIEF SUMMARY OF THE INVENTION

Embodiments include: (1) an architecture modeling method; (2) a computer system to perform the architecture modeling method; and (3) a related computer program product, that provide for generating multiple architecture viewpoints in a single unified modeling language (UML) model.

The embodiments realize the foregoing result by providing that a UML modeling tool user selects a plurality of particular architecture viewpoints for modeling an architecture of IT system and then the tool selects from a configuration file for the IT system particular model elements that encompass each of the plurality of particular architecture viewpoints to provide a plurality of architecture viewpoint that comprise the single UML model. The embodiments further provide that when manually updating any one particular architecture viewpoint within the plurality of architecture viewpoints within the single UML model with an added or deleted model element, the UML modeling tool synchronously automatically updates the remaining of the plurality of architecture viewpoints in accordance with the one particular architecture viewpoint that was updated.

A particular architecture modeling method in accordance with the embodiments includes designating within a single Unified Modeling Language model a plurality of architecture viewpoints for modeling an IT system comprising a plurality of model elements defined in a configuration file. The particular architecture modeling method also includes: (i) receiving a selection of one of the plurality of architecture viewpoints; (ii) determining which of the plurality of model elements is associated with the selected architecture viewpoint; (iii) displaying each of the plurality of model elements which is associated with the selected architecture viewpoint; and (iv) hiding each of the plurality of model elements which is not associated with the selected architecture viewpoint.

A particular computer system in accordance with the embodiments includes a computer programmed to: (1) designate within a single Unified Modeling Language model a plurality of architecture viewpoints for modeling an IT system comprising a plurality of model elements defined in a configuration file; (2) receive a selection of one of the plurality of architecture viewpoints; (3) determine which of the plurality of model elements is associated with the selected architecture viewpoint; (4) display each of the plurality of model elements which is associated with the selected architecture viewpoint; and (5) hide each of the plurality of model elements which is not associated with the selected architecture viewpoint.

A particular computer program product in accordance with the embodiments includes a machine readable medium encoded with instructions to: (1) designate within a single Unified Modeling Language model a plurality of architecture viewpoints for modeling an IT system comprising a plurality of model elements defined in a configuration file; (2) receive a selection of one of the plurality of architecture viewpoints; (3) determine which of the plurality of model elements is associated with the selected architecture viewpoint; (4) display each of the plurality of model elements which is associated with the selected architecture viewpoint; and (5) hide each of the plurality of model elements which is not associated with the selected architecture viewpoint.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Figure 1:
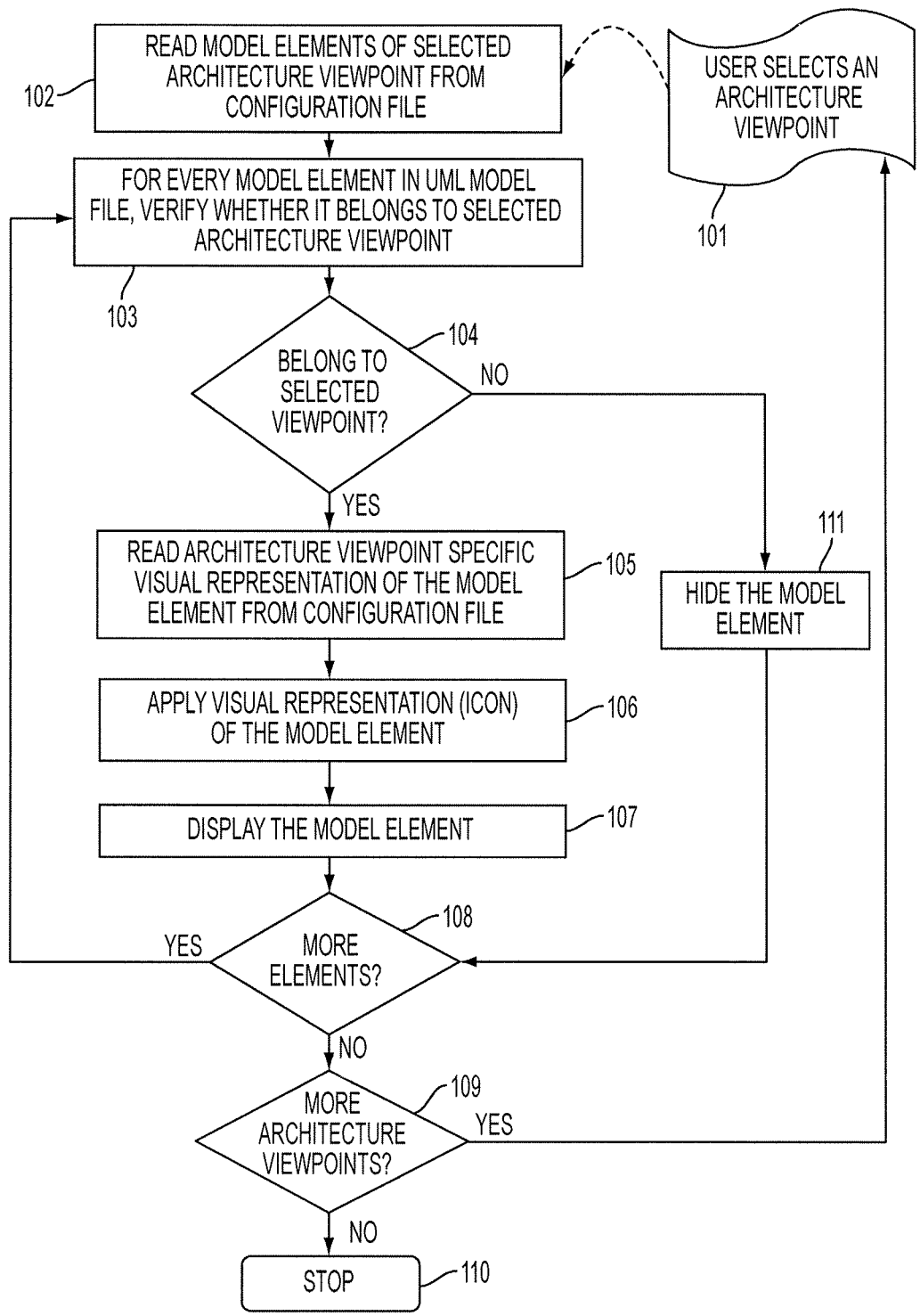
FIG. 1 shows a flow chart representation of an algorithm that may be used to display an architecture viewpoint within a single UML model in accordance with the embodiments.

Embodiments include: (1) an architecture modeling method; (2) a computer system to perform the architecture modeling method; and (3) a related computer program product, that provide for generating multiple architecture viewpoints in a single unified modeling language (UML) model.

The embodiments realize the foregoing result by providing that a UML modeling tool user selects a plurality of particular architecture viewpoints for modeling an IT system and then the system selects from a configuration file for the IT system particular model elements that encompass each of the plurality of particular architecture viewpoints to provide a plurality of architecture viewpoints that comprise the single UML model. The embodiments further provide that when manually updating any one particular architecture viewpoint within the plurality of architecture viewpoint within the single UML model with an added or deleted model element, the UML modeling tool synchronously automatically updates the remaining of the plurality of architecture viewpoints in accordance with the one particular architecture viewpoint that was updated.

The following are definitions and background information intended within the context of the instant disclosure and the following embodiments.

A "Unified Modeling Language" (UML) is a standardized general-purpose modeling language in the field of software engineering. The standard is managed, and was created by, the Object Management Group (OMG). UML includes a set of graphic notation techniques to create visual models of software-intensive systems.

A "Meta-Class/Type/UML Element" is an element of standard UML meta-model. Examples: Class, Interface.

A "UML Model" is an abstract model of specific system. It consists of elements such as packages, classes, and associations. The corresponding UML diagrams are graphical representations of parts of the UML model. UML diagrams contain graphical elements (nodes connected by paths) that represent elements in the UML model. As an example, two associated classes defined in a package will, in a diagram for the package, be represented by two class symbols and an association path connecting these two class symbols.

A "UML Profile" provides a generic extension mechanism for customizing UML models for particular domains and platforms. The extension mechanisms allow refining standard semantics in strictly additive manner, so that they can not contradict standard semantics. The UML profiles are defined using stereotypes, tag definitions, and constraints that are applied to specific model elements, such as Classes, Attributes, Operations, and Activities. A UML Profile is a collection of such extensions that collectively customize UML for a particular domain (e.g., aerospace, healthcare, financial) or platform (JEE, MS .NET) e.g., "SOA Profile" UML Profile.

A "Stereotype" defines how an existing meta-class may be extended, and enables the use of platform or domain specific terminology or notation in place of, or in addition to, the ones used for the extended meta-class. Example: "ServiceMessage" stereotype of "SOA Profile" UML Profile extends "Class" metaclass.

A "Proxy Element" (i.e., a proxy mode; element) is a new type of model element added by the embodiments to differentiate it from an existing UML Element (i.e., a standard model element) but provides look and feel of a standard UML Element.

A "Rational Software Architect" is an IBM advanced model-driven software development tool. It leverages model-driven development with the UML for creating well-architected applications and services.

A "Rational Software Modeler" is an IBM robust collaborative software platform for visual software modeling and design.

The embodiments that follow include three separate algorithms that operate within the context of a single UML model to provide for modeling of a plurality of architecture viewpoints of an IT system whose model elements are contained within a configuration file. The embodiments also provide for synchronously automatically revising a plurality of architecture viewpoints that correspond with the architecture viewpoints by addition or deletion of a model element within all of the remaining architecture viewpoints when the model element is revised (i.e., added or deleted) within one of the architecture viewpoints.

In accordance with the foregoing, a first feature of the embodiments is an algorithm to display architecture viewpoint specific package structure and modeling elements (i.e., generally individually or in an aggregate referred to and defined as a "model element" or "model elements" in accordance with the embodiments as disclosed, and the invention as claimed) for a plurality of architecture viewpoints in a single UML model.

A second feature of the embodiments is an algorithm to synchronize automatic addition of a new model element across all architecture viewpoints in a single UML model when adding the new model element in one particular architecture viewpoint within the single UML model.

A third feature of the embodiments is an algorithm to synchronize automatic removal of an existing target model element across all architecture viewpoints in a single UML model when removing the existing model element from one particular architecture viewpoints within the single UML model.

A fourth feature of the embodiments is implementation of the foregoing three algorithms in a UML modeling tool.

FIG. 1 shows a flowchart diagram for defining within a single UML model a plurality of architecture viewpoints for an IT system whose model elements are contained within an UML Model file.

FIG. 1 at reference numeral 101 provides that a user selects an architecture viewpoint, within the context of a UML modeling tool. As is understood by a person skilled in the art, the UML modeling tool may provide any of several architecture viewpoints that may be selected.

FIG. 1 at reference numeral 102 provides that the UML modeling tool reads model elements of the selected architecture viewpoint from an UML Model file for a particular computer system.

FIG. 1 at reference numeral 103 provides that for every model element in the UML model, the UML modeling tool verifies whether the particular model element belongs to the architecture viewpoint selected by the user by reading the configuration file.

FIG. 1 at reference numeral 104 provides an inquiry and related directional pathway selection to reference numeral 105 if a particular model element is within the user selected architecture viewpoint. Similarly, when the particular model element is not within the user selected architecture viewpoint that particular model element is hidden from further view and consideration in an architecture viewpoint, in accordance with reference numeral 111.

FIG. 1 at reference numeral 105 provides that the UML modeling tool reads an architecture viewpoint specific visual representation of the model element from the configuration file under circumstances where a response to the inquiry in accordance with reference numeral 104 is in the affirmative.

FIG. 1 at reference numeral 106 provides that the UML modeling tool applies an architecture viewpoint specific visual representation of the proxy element.

FIG. 1 at reference numeral 107 provides that the UML modeling tool displays the architecture viewpoint specific visual representation of the proxy element within an architecture viewpoint within a single UML model within the UML modeling tool.

FIG. 1 at reference numeral 108 provides that the UML modeling tool verifies whether any additional model elements need to be considered for a particular architecture viewpoint.

If additional model elements are to be considered for a particular architecture viewpoint, the flowchart as illustrated in FIG. 1 cycles back, repetitively as needed, to the process step that corresponds with reference numeral 103, until all model elements are exhausted for a particular architecture viewpoint. If no additional model elements need to be considered for a particular architecture viewpoint, the algorithm in accordance with the process steps of FIG. 1 progresses to reference numeral 109.

FIG. 1 at reference numeral 109 provides that the UML modeling tool inquires whether any additional architecture viewpoints are to be considered and evaluated with respect to the UML Model file.

If additional architecture viewpoints are to be considered and evaluated, the algorithm in accordance with FIG. 1 cycles back to the process step that corresponds with reference numeral 101, and the entire evaluation cycle is performed with respect to an additional architecture viewpoint to provide an additional architecture viewpoint.

If no additional architecture viewpoints are to be considered and evaluated, FIG. 1 at reference numeral 110 provides that the algorithm in accordance with FIG. 1 is terminated.

As is understood by a person skilled in the art, the process steps encompassed by the algorithm as illustrated in FIG. 1 are thus repeated by the user for a multiplicity of architecture viewpoints and for a multiplicity of model elements, to in turn provide a plurality of architecture viewpoints within a single UML model.

Thus, the foregoing series of process steps in accordance with the algorithm of FIG. 1 provide a series of process steps to determine, designate and display a series of architecture viewpoints for a particular IT system whose UML Model file is under consideration.

Figure 2:
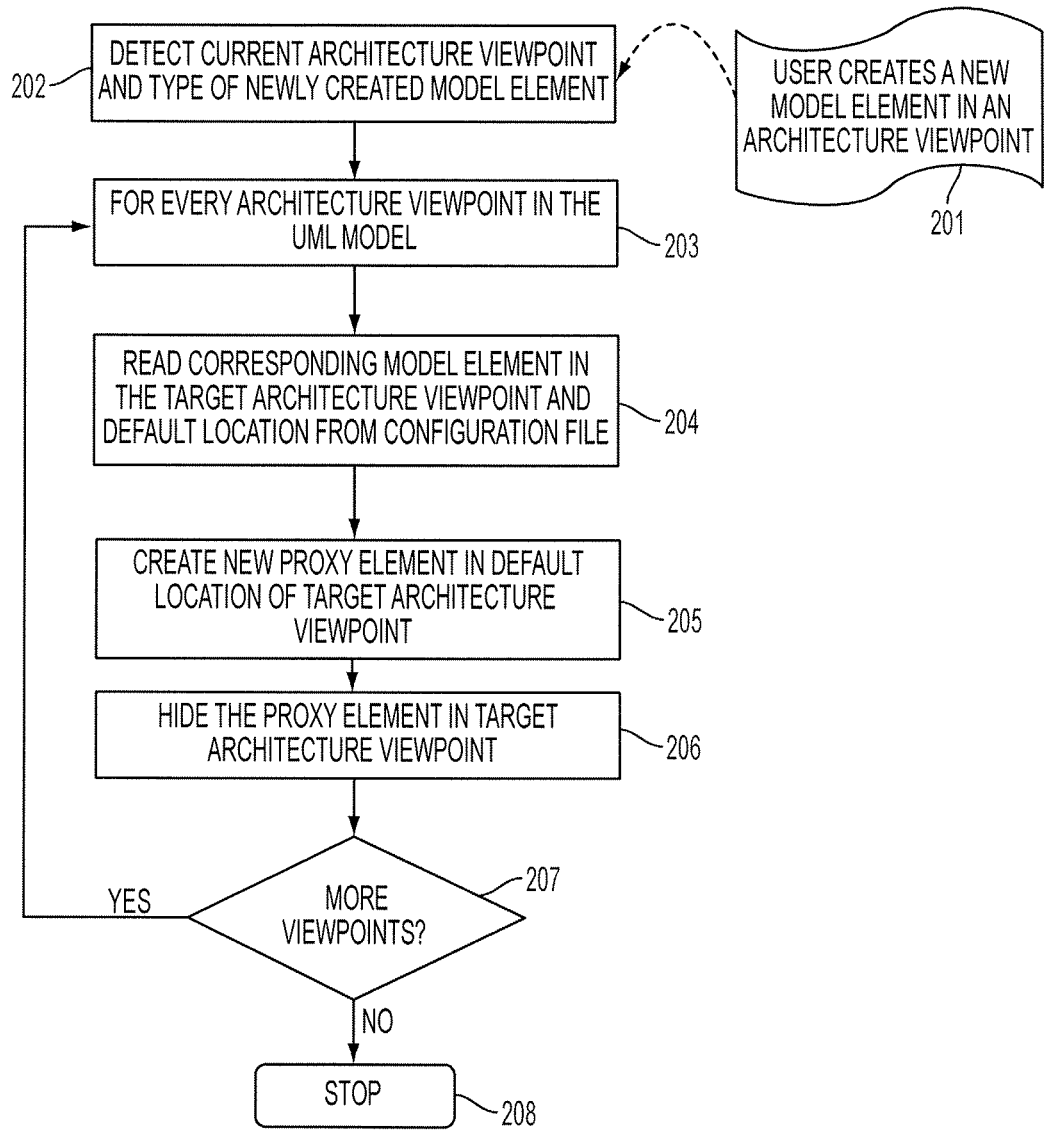
FIG. 2 shows a flow chart representation of an algorithm that may be used to synchronize automatic incorporation of a new model element across a plurality of architecture viewpoints in the single UML model in accordance with the embodiments.

FIG. 2 shows an additional flowchart diagram illustrating a series of process steps within an algorithm that is undertaken within a UML modeling tool in accordance with the embodiments, for adding a model element to a plurality of architecture viewpoints within a single UML model.

FIG. 2 at reference numeral 201 provides that a user creates a new model element within a particular architecture viewpoint within a single UML model within a UML modeling tool.

FIG. 2 at reference numeral 202 provides that the UML modeling tool detects the particular architecture viewpoint and a type of newly created model element.

FIG. 2 at reference numeral 203 provides that subsequent process steps within the algorithm in accordance with FIG. 2 are undertaken for each architecture viewpoint within a particular single UML model that includes a plurality of architecture viewpoints (i.e., generally determined in accordance with the algorithm as illustrated in FIG. 1).

FIG. 2 at reference numeral 204 provides that the UML modeling tool reads a corresponding model element in a remaining target architecture viewpoint and a default location of the model element from the configuration file.

FIG. 2 at reference numeral 205 provides that the UML modeling tool creates a new proxy element in the default location of the target architecture viewpoint.

FIG. 2 at reference numeral 206 provides that the UML modeling tool hides the proxy element in the target architecture viewpoint at the default location.

FIG. 2 at reference numeral 207 provides that the UML modeling tool inquires whether any additional architecture viewpoints remain to be synchronized for addition of the new model element.

If an architecture viewpoint remains to be synchronized for addition of the new model element, the algorithm in accordance with the process steps of FIG. 2 circles back repetitively, as needed, to the process step that corresponds with reference numeral 203. If no architecture viewpoint exists for addition of the new model element, the algorithm in accordance with the process steps of FIG. 2 is terminated in accordance with reference numeral 208.

Thus, the algorithm in accordance with the process steps of FIG. 2 provides for updating a remaining number of architecture viewpoints within a single UML model that comprises a plurality of architecture viewpoints when a single architecture viewpoint within the plurality of architecture viewpoints are updated with a new model element.

Figure 3:
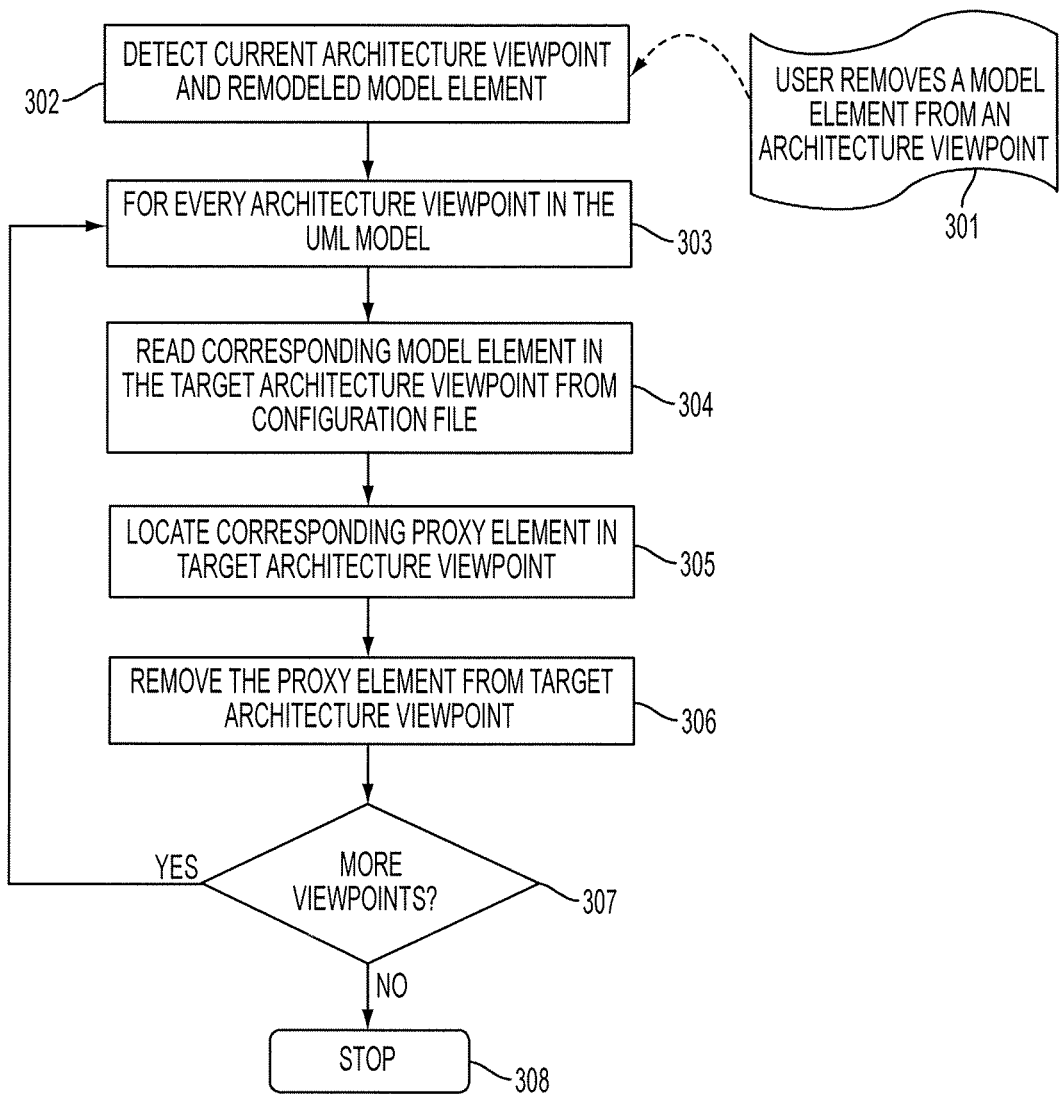
FIG. 3 shows a flow chart representation of an algorithm that may be used to synchronize automatic removal of an existing model element across a plurality of architecture viewpoints in the single UML model in accordance with the embodiments.

FIG. 3 shows a flowchart diagram of a series of process steps in accordance with a third algorithm in accordance with the embodiments that is employed for deleting a model element from a remainder of architecture viewpoints within a plurality of architecture viewpoints when a single model element is deleted from a particular architecture viewpoint that comprises the plurality of architecture viewpoints. To that end, the algorithm encompassed by FIG. 3 relates to the algorithm encompassed by FIG. 2, but is directed towards deletion of an existing model element rather than addition of a new model element.

FIG. 3 at reference numeral 301 provides that a user removes a model element from a current architecture viewpoint of the single UML model that comprises the plurality of architecture viewpoint specifics in the UML modeling tool.

FIG. 3 at reference numeral 302 provides that the UML modeling tool detects the current architecture viewpoint and the removed model element.

FIG. 3 at reference numeral 303 provides that the subsequent process steps are undertaken for each of the remaining architecture viewpoints in the single UML model other than the architecture viewpoint from which the user has removed the model element.

FIG. 3 at reference numeral 304 provides that the UML modeling tool reads a target model element corresponding to removed model element in a target architecture viewpoint from a configuration file.

FIG. 3 at reference numeral 305 provides that the UML modeling tool locates a corresponding target model element (i.e., which may be either an original model element or a proxy model element) in the target architecture viewpoint.

FIG. 3 at reference numeral 306 provides that the UML modeling tool removes the target model element from target architecture viewpoint.

FIG. 3 at reference numeral 307 verifies the existence of additional target architecture viewpoints from which a target model element is desirably removed.

If additional target architecture viewpoints exist, the UML modeling tool in accordance with the embodiments cycles back repetitively, as needed, to the process step that corresponds with reference numeral 303. If no additional target architecture viewpoint exists, the UML modeling tool terminates the iterative processing in accordance with reference numeral 308 the algorithm in accordance with FIG. 3.

Thus, the algorithm in accordance with the process steps of FIG. 3 provides a method for synchronously automatically removing from remaining architecture viewpoints within a single UML model that comprises a plurality of architecture viewpoints a plurality of target model elements (i.e., which may be either original model elements or proxy model elements) when removing a single model element from a single architecture viewpoint within the UML model that comprises the plurality of architecture viewpoints.

FIG. 4 to FIG. 8 show a series of graphical user interface images representative of a graphical user interface apparatus at various stages in operation of the UML method in accordance with the embodiments, and in particular with the algorithms of FIG. 1, FIG. 2 and FIG. 3.

Figure 4:
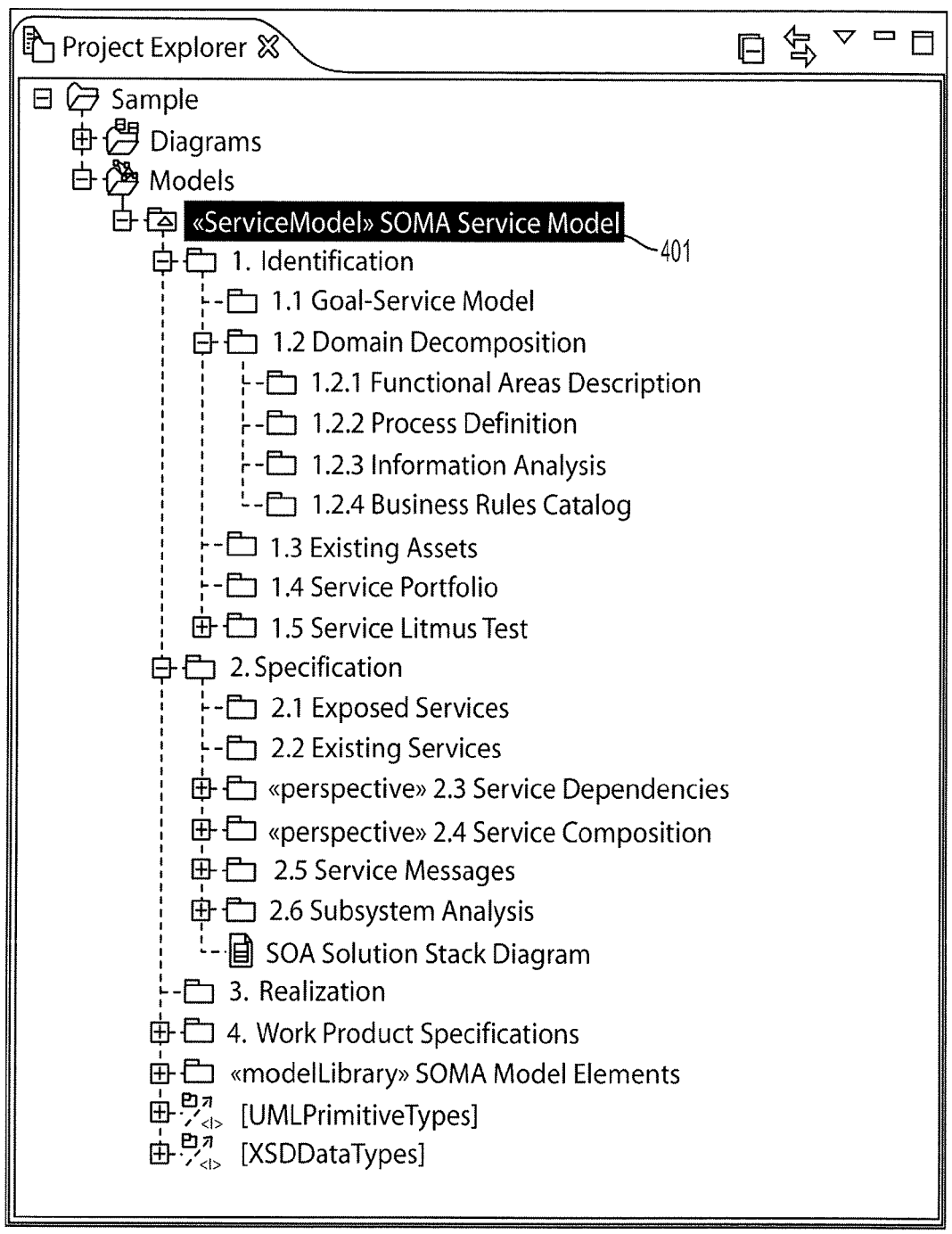
FIG. 4 shows a graphical user interface image of a UML representation of a Service Model architecture viewpoint in accordance with the embodiments.

FIG. 4 in particular shows a graphical user interface image of a first architecture viewpoint in accordance with the embodiments. In accordance with reference numeral 401, the first architecture viewpoint comprises a Service Model architecture viewpoint for an IT system.

Figure 5:
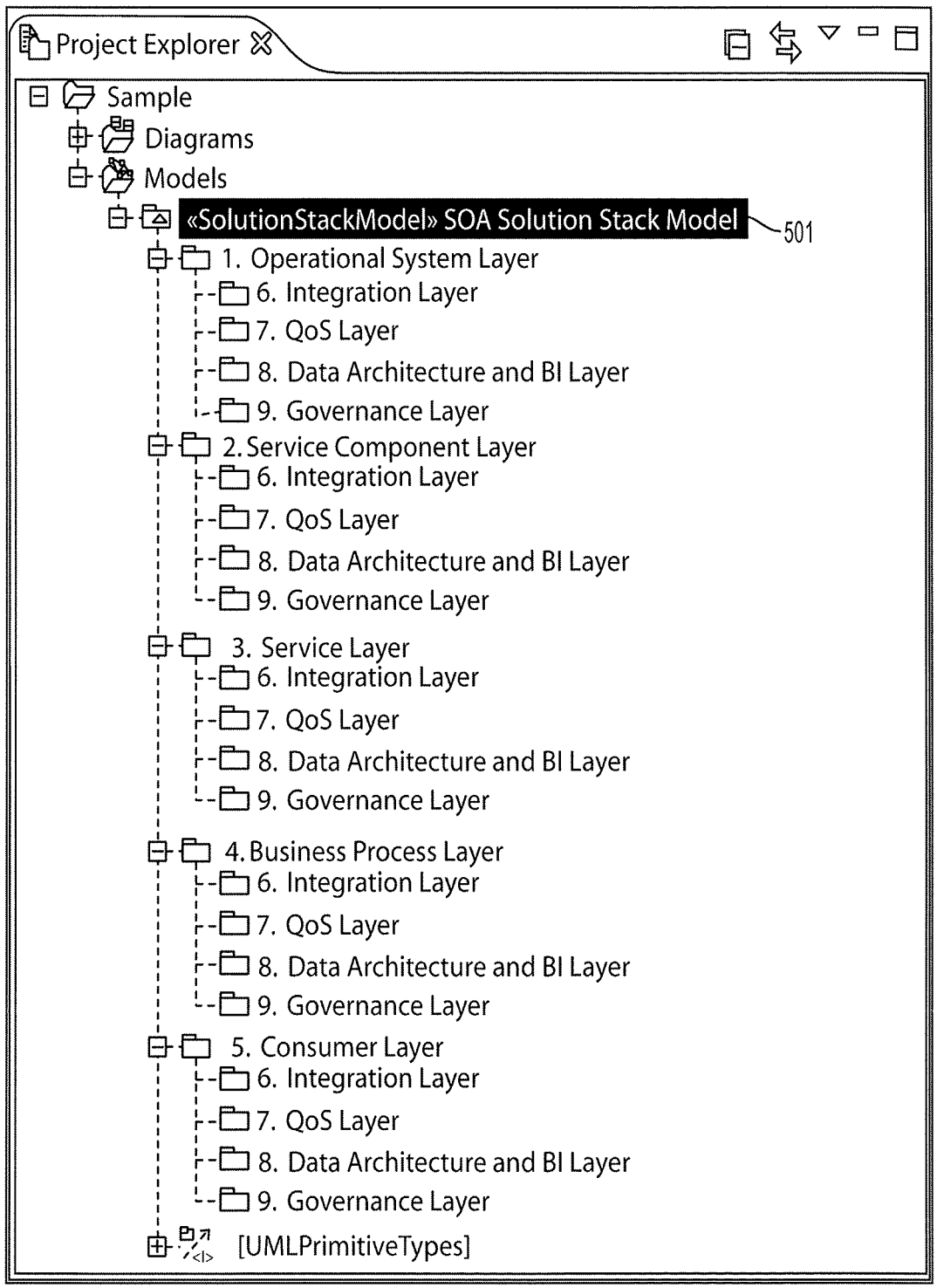
FIG. 5 shows a graphical user interface image of a UML representation of a SOA Solution Stack Model architecture viewpoint in accordance with the embodiments.

FIG. 5 in particular shows a graphical user interface image of a second architecture viewpoint in accordance with the embodiments. In accordance with reference numeral 501, the second architecture viewpoint comprises a SOA Solution Stack Model architecture viewpoint for an IT system.

Figure 6:
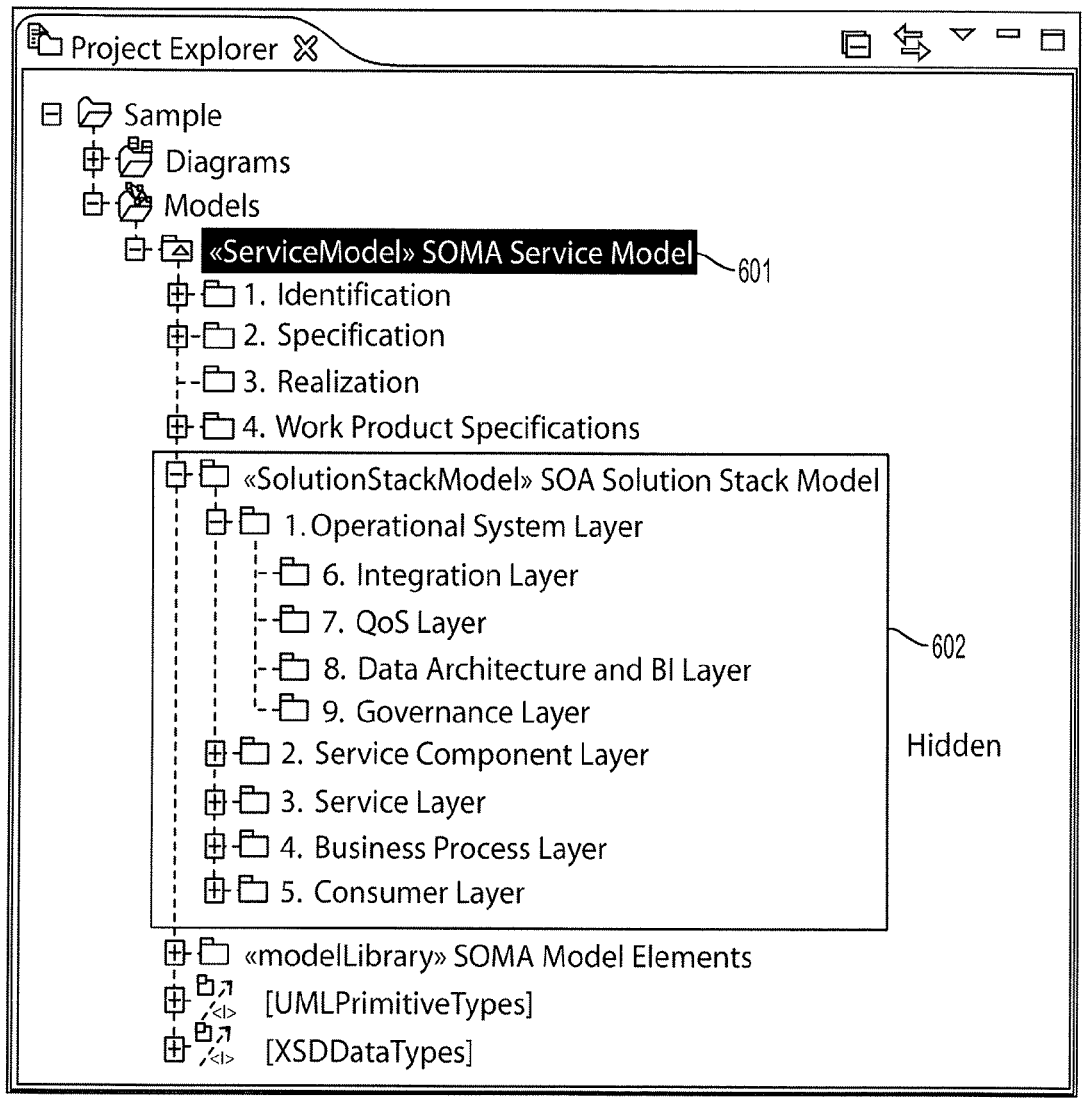
FIG. 6 shows a graphical user interface image of a Service Model architecture viewpoint and a SOA Solution Stack Model architecture viewpoint in a single UML model in accordance with the embodiments.

FIG. 6 in particular shows the integration of the Service Model (reference numeral 601) architecture viewpoint of FIG. 4 and the SOA Solution Stack Model architecture viewpoint (reference numeral 602) of FIG. 5 into a single UML Model. As is illustrated within the graphical view of FIG. 6, the SOA Solution Stack Model architecture viewpoint is intended to be hidden from normal view.

Figure 7:
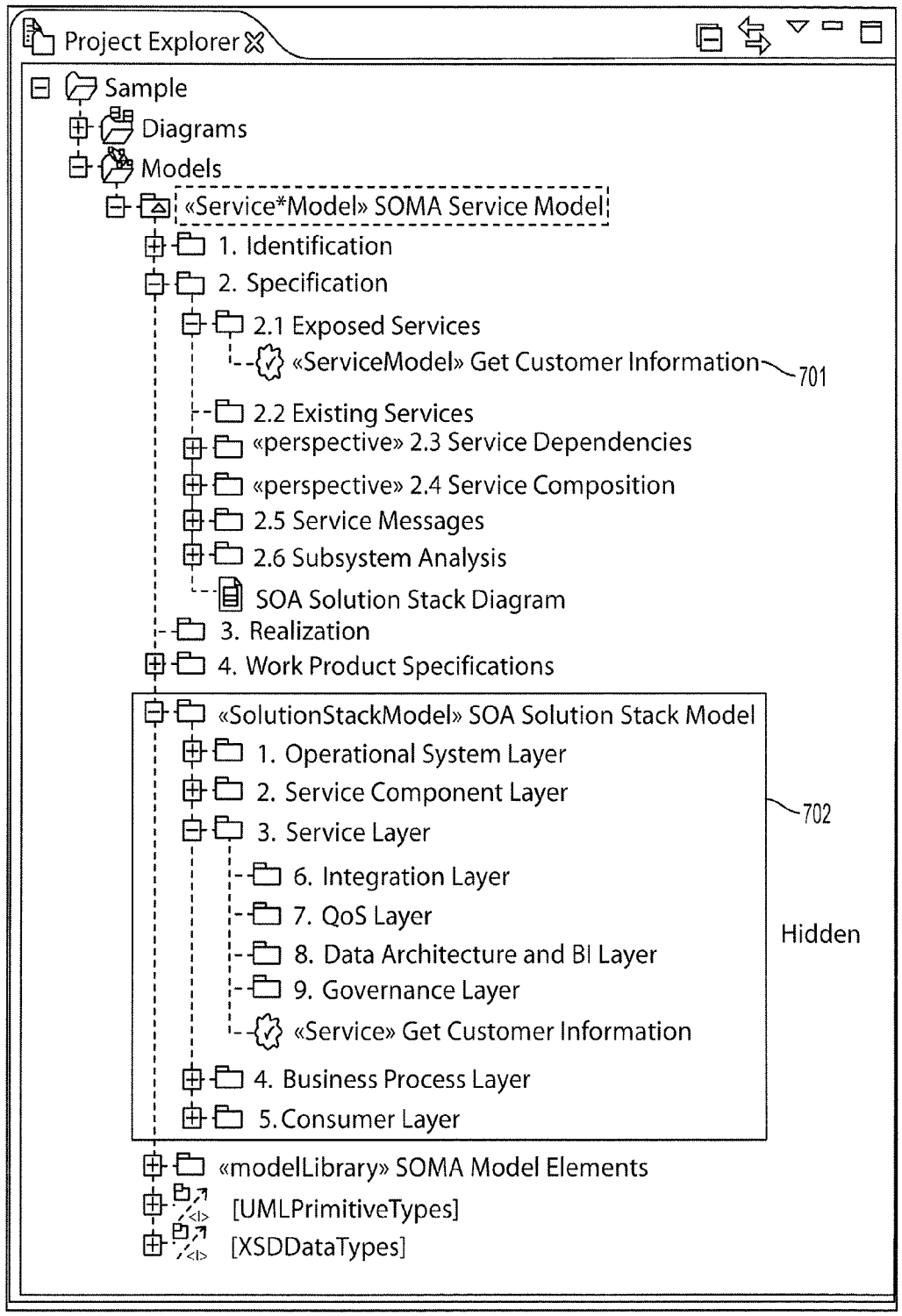
FIG. 7 shows a "Service" model element in a Service Model architecture viewpoint and a corresponding proxy element with look-and-feel of a "Service" model element in an SOA Solution Stack Model architecture viewpoint in a single UML model in accordance with the embodiments.

FIG. 7 in particular shows the results of incorporating at reference numeral 701 a "Get Customer Information" model element into an "Exposed Services" subsection of a "Specification" section within a Service Model architecture viewpoint, which synchronously automatically incorporates hidden at reference numeral 702 a "Get Customer Information" model element within a "Service Layer" section within a SOA Solution Stack Model architecture viewpoint.

Figure 8:
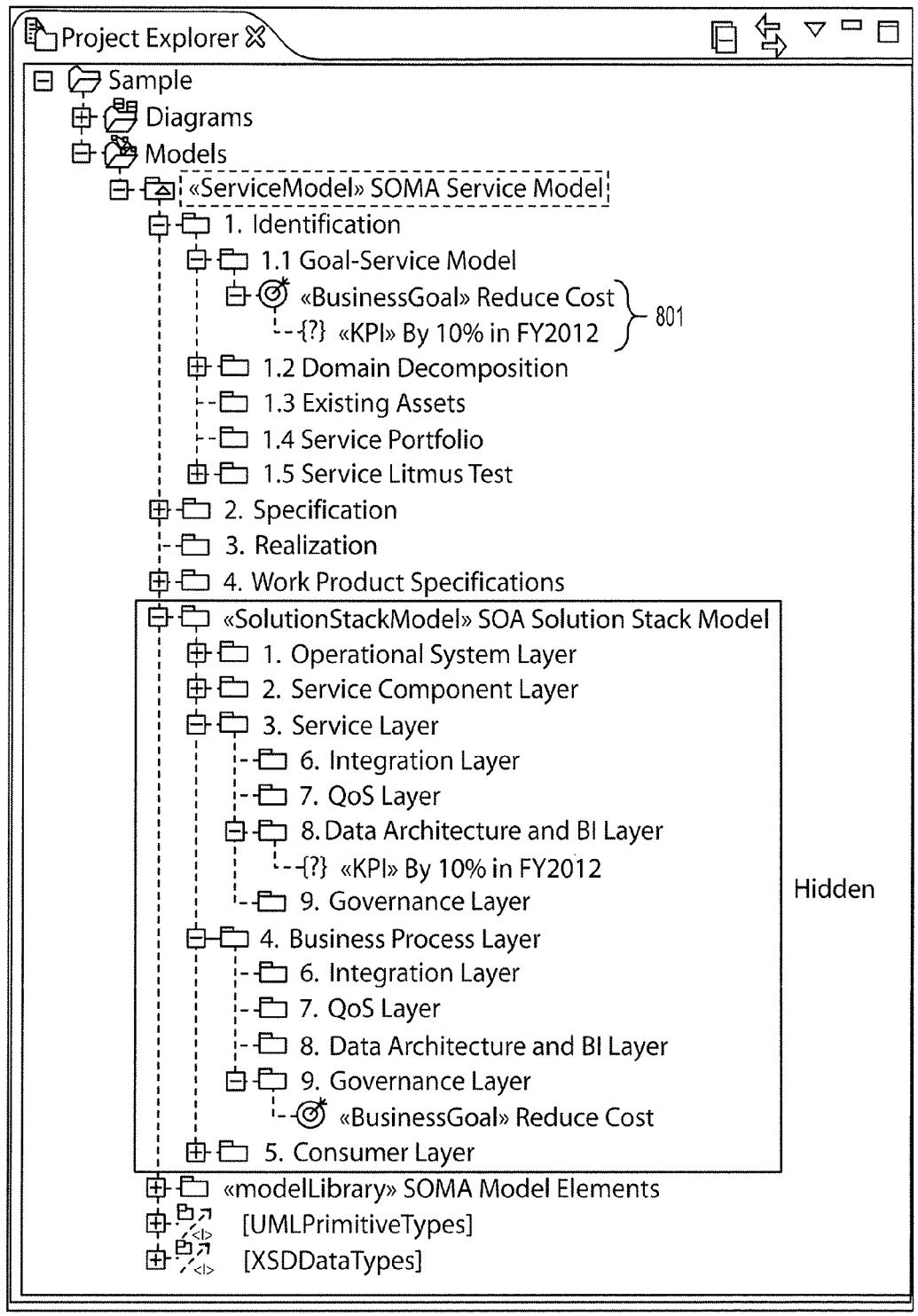
FIG. 8 shows a Business Goal and KPI model elements in a Service Model architecture viewpoint and a corresponding proxy elements with look-and-feel of Business Goal and KPI model elements in an SOA Solution Stack Model architecture viewpoint in a single UML model in accordance with the embodiments.

FIG. 8 in particular shows the results of incorporating at reference numeral 801 a "Reduce Cost" Business Goal model element into an "Goal-Services Model" sub-section of an "Identification" section within a Service Model architecture viewpoint, which synchronously automatically incorporates hidden at reference numeral 802 a "Reduce Cost" Business Goal model element within an intersection of "Data Architecture and BI Layer", and a "Governance Layer", within a SOA Solution Stack Model architecture viewpoint.

Within the context of the foregoing algorithms of FIG. 1 to FIG. 3 and the related graphical user interface images of FIG. 4 to FIG. 8, the embodiments also contemplate a computer system in accordance with the embodiments that may be used to perform or carry out methodological process steps in accordance with the algorithms in accordance with the embodiments. Such a computer system is illustrated schematically within FIG. 9.

Figure 9:
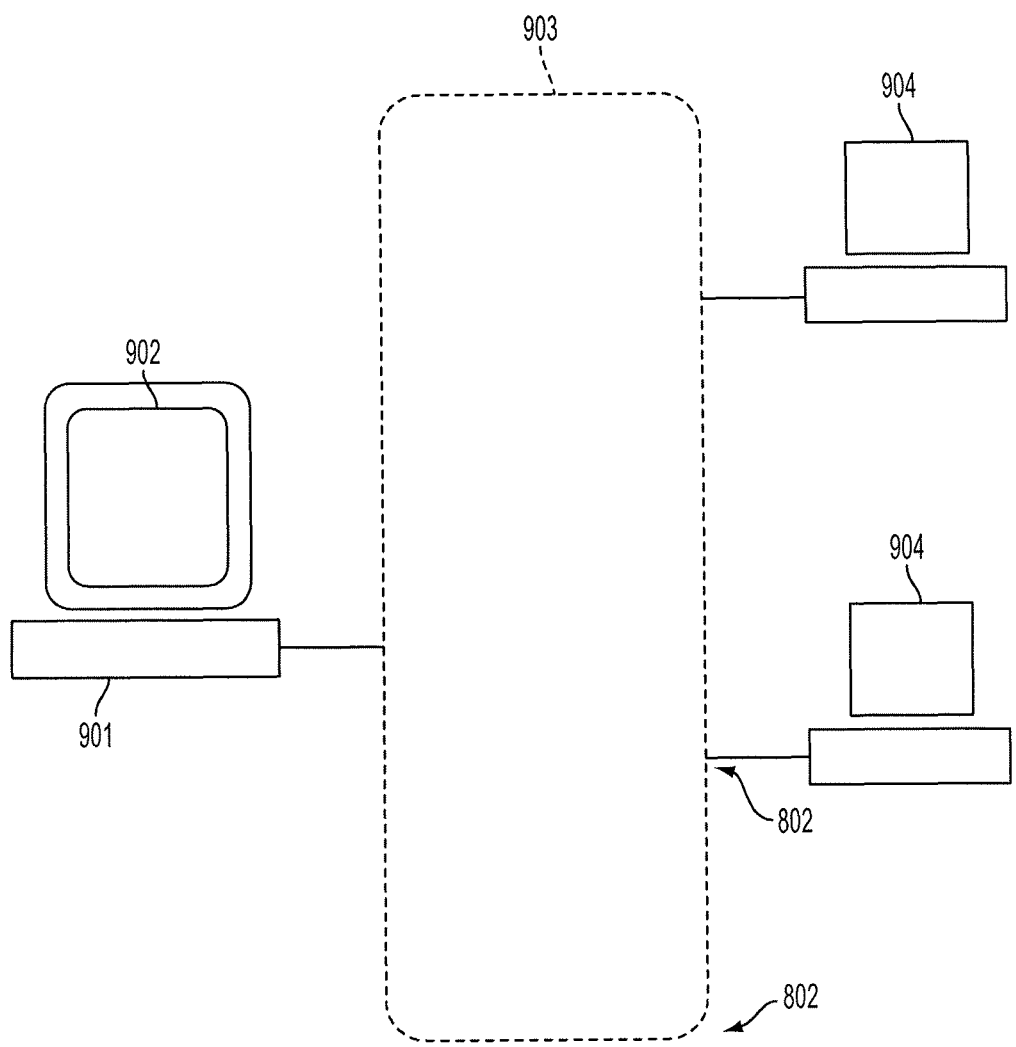
FIG. 9 shows a schematic diagram of a computer system that may be used in accordance with the embodiments.

FIG. 9 in particular illustrates a UML modeling tool 901 that may comprise a computer system in itself. The UML modeling tool also comprises a graphical user interface 902. FIG. 9 also illustrates a network 903 to which is attached the UML modeling tool 901, as well as other remote access user interface tools 904. Within the schematic diagram of FIG. 9, the UML modeling tool may comprise any of several types of computers or computer systems that are otherwise generally conventional in the computer system design and assembly art. Such computers or computer system types may include, but are not necessarily limited to, personal computers, server computers, midrange computers and mainframe computers. Each of the remote access user interface tools 904 may also comprise any of the foregoing several types of computers, as well as a computer terminal. Finally, the network 903 may comprise any of several types of computer networks, including but not limited to Internet networks, intranet networks and under certain circumstances telecommunications networks.

In order to further facilitate operation of an IT system architecture modeling method in accordance with the embodiments, the embodiments also contemplate that a computer program product (i.e., that typically is, but not necessarily, included within the UML modeling tool) is also within the context of the embodiments. Such a computer program product comprises a tangible medium that provides instructions encoded therein for: (1) designating within a single Unified Modeling Language model a plurality of architecture viewpoints for modeling an IT system comprising a plurality of model elements defined in a configuration file; and (2) determining for each of the plurality of architecture viewpoints an architecture viewpoint that comprises a set of model elements from the configuration file consistent with a particular architecture viewpoint within the plurality of architecture viewpoints.

Accordingly, within the context of the above, computer program product aspects of the embodiments may take the form of a computer program product embodied in one or more computer readable media having computer readable program code embodied thereon.

Any combination of one or more computer readable media may be utilized. The computer readable media may be a computer readable signal media or a computer readable storage media. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store, a program for use by or in connection with an instruction system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may be performed or carried out entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are performed or carried out via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions which are performed or carried out via the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function or functions. It should also be noted that in some alternative implementations the functions noted in the block may occur out of the order noted in the figures. For example, two blocks shown in succession may in fact be performed or carried out substantially concurrently, or the blocks may sometimes be performed or carried out in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction.

Accordingly, the embodiments of the invention are illustrative of the invention rather than limiting of the invention. Revisions and modifications may be made to components, connections and computer system architecture in accordance with the embodiments while still providing a method, a system and a computer program product in accordance with the embodiments, further in accordance with the accompanying claims

What is claimed is:

1. An information technology (IT) system architecture modeling method comprising the steps of:
designating within a single Unified Modeling Language model a plurality of architecture viewpoints for modeling an IT system comprising a plurality of model elements defined in a configuration file;
receiving a selection of one of said plurality of architecture viewpoints;
determining which of said plurality of model elements is associated with the selected architecture viewpoint;
displaying each of said plurality of model elements which is associated with the selected architecture viewpoint;
hiding each of said plurality of model elements which is not associated with the selected architecture viewpoint;
receiving a new model element created by a user;
determining a characteristic of said new model element; and
for each of said plurality of architecture viewpoints:
determining which of said plurality of model elements is both: (i) associated with said architecture viewpoint and (ii) corresponding to said new model element;
determining a default location of each of said determined model elements; creating a new proxy element at said default location; and
hiding the new proxy element in the architecture viewpoint.

2. The method of claim 1, wherein each of said model elements is represented by an icon.

3. The method of claim 1, further comprising the steps of:
receiving notification that a user has removed at least one of said plurality of model elements from at least one of said plurality of architecture viewpoints;
for each of said plurality of architecture viewpoints:
determining which of said plurality of model elements is both: (i) associated with said architecture viewpoint and (ii) corresponding to said removed model element;
locating at least one corresponding proxy element corresponding to said removed model element; and
removing said at least one corresponding proxy element from said architecture viewpoint.

4. The method of claim 1 wherein the computer system comprises at least one of a computer hardware system and a computer software system.

5. The method of claim 1 wherein the computer system comprises both a computer hardware system and a computer software system.

6. A system comprising:
a computer programmed to:
designate within a single Unified Modeling Language model a plurality of architecture viewpoints for modeling an information technology (IT) system comprising a plurality of model elements defined in a configuration file;

receive a selection of one of said plurality of architecture viewpoints;

determine which of said plurality of model elements is associated with the selected architecture viewpoint;

display each of said plurality of model elements which is associated with the selected architecture viewpoint;

hide each of said plurality of model elements which is not associated with the selected architecture viewpoint;

receive a new model element created by a user;

determine a characteristic of said new model element; and for each of said plurality of architecture viewpoints:
    determine which of said plurality of model elements is both: (i) associated with said architecture viewpoint and (ii) corresponding to said new model element;
    determine a default location of each of said determined model elements; create a new proxy element at said default location; and
    hide the new proxy element in the architecture viewpoint.

7. The system of claim 6, wherein each of said model elements is represented by an icon.

8. The system of claim 6, wherein the computer is further programmed to:

receive notification that a user has removed at least one of said plurality of model elements from at least one of said plurality of architecture viewpoints;

for each of said plurality of architecture viewpoints:
    determine which of said plurality of model elements is both: (i) associated with said architecture viewpoint and (ii) corresponding to said removed model element;
    locate at least one corresponding proxy element corresponding to said removed model element; and
    remove said at least one corresponding proxy element from said architecture viewpoint.

9. The system of claim 6 wherein the computer system comprises at least one of a computer hardware system and a computer software system.

10. The system claim 6 wherein the computer system comprises both a computer hardware system and a computer software system.

11. A computer program product comprising a machine readable medium encoded with instructions to:

designate within a single Unified Modeling Language model a plurality of architecture viewpoints for modeling an information technology (IT) system comprising a plurality of model elements defined in a configuration file;

receive a selection of one of said plurality of architecture viewpoints;

determine which of said plurality of model elements is associated with the selected architecture viewpoint;

display each of said plurality of model elements which is associated with the selected architecture viewpoint;

hide each of said plurality of model elements which is not associated with the selected architecture viewpoint;

receive a new model element created by a user;

determine a characteristic of said new model element; and for each of said plurality of architecture viewpoints:
    determine which of said plurality of model elements is both: (i) associated with said architecture viewpoint and (ii) corresponding to said new model element;
    determine a default location of each of said determined model elements; create a new proxy element at said default location; and
    hide the new proxy element in the architecture viewpoint.

12. The computer program product of claim 11, wherein each of said model elements is represented by an icon.

13. The computer program product of claim 11 wherein the machine readable medium is further encoded with instructions to:

receive notification that a user has removed at least one of said plurality of model elements from at least one of said plurality of architecture viewpoints;

for each of said plurality of architecture viewpoints:
    determine which of said plurality of model elements is both: (i) associated with said architecture viewpoint and (ii) corresponding to said removed model element;
    locate at least one corresponding proxy element corresponding to said removed model element; and
    remove said at least one corresponding proxy element from said architecture viewpoint.

14. The computer program product of claim 11 wherein the computer system comprises at least one of a computer hardware system and a computer software system.

15. The computer program product of claim 11 wherein the computer system comprises both a computer hardware system and a computer software system.

\* \* \* \* \*